United States Patent [19]

Packer et al.

[11] Patent Number: 5,043,378

[45] Date of Patent: Aug. 27, 1991

[54] HIGH TEMPERATURE SILICIDE PROTECTIVE COATING SLURRY

[75] Inventors: Charles M. Packer, Redwood City; Constance A. Henshall, Sunnyvale; Earl K. Montgomery, Los Gatos, all of Calif.

[73] Assignee: The United States of America as represented by the Secretary of the Navy, Washington, D.C.

[21] Appl. No.: 673,049

[22] Filed: Mar. 21, 1991

[51] Int. Cl.$^5$ .......................... C08J 7/16; C08K 3/08; C08L 33/10

[52] U.S. Cl. ................................... 524/440; 524/442; 524/476; 524/478; 524/479; 524/480; 524/848

[58] Field of Search .............. 524/476, 478, 479, 480, 524/440, 442, 848

[56] References Cited

PUBLICATIONS

"Development of a Fused Slurry Silicide Coating for the Protection of Tantalum Alloys", C. M. Packer and R. A. Perkins; *Journal of the Less Common Metals*, 37(1974), 361–378.

Naval Ordnance Command Weapon Specification 17302 (NAVORD WS 17302), entitled Material Specification, Slurry, Hafnium Silicide.

Final Report No. VHP-SDC-572 prepared for NASA Marshall Flight Center under contract NAS 8-27280, dated Apr. 1972, by VAC-HYD Processing Corp., entitled: Coating and Processing of Columbium Panels for Space Shuttle Application.

*Primary Examiner*—Paul R. Michl
*Assistant Examiner*—U. K. Rajguru
*Attorney, Agent, or Firm*—Wayne O. Hadland; Kenneth L. Warsh; Robert M. Wohlfarth

[57] ABSTRACT

A coating slurry comprised of 42 percent silicon and 10 percent chromium metal powders; 45 percent lacquer base including toluene, xylene, and a polymeric binder; and 3 percent antisettling agent. After the slurry has been applied and then subjected to a high temperature vacuum processing, a ceramic coating is obtained which provides 3000° F. high temperature oxidation protection for a refractory tantalum alloy substrate.

5 Claims, No Drawings

HIGH TEMPERATURE SILICIDE PROTECTIVE COATING SLURRY

FIELD OF THE INVENTION

This invention pertains to high temperature protective coating materials, and more particularly to a coating slurry suitable for being processed into a ceramic coating for protecting the surfaces of a ninety-percent-tantalum ten-percent-tungsten metal manifold from the oxidizing environment of 3000° F. gases emanating from a solid-propellant-fueled hot gas generator.

BACKGROUND OF THE INVENTION

A metal manifold constructed of a ninety-percent-tantalum ten-percent-tungsten refractory alloy (Ta-10W) is coated by spraying a slurry onto the exterior surfaces, and by filling with slurry and draining to coat the interior surfaces. The coated manifold is then placed in a vacuum oven for approximately 45 minutes at approximately 2550° F., causing the unfired (i.e., green) slurry to undergo a fusion reaction producing a ceramic coating of complex silicides. During system operation at higher temperatures (i.e., 3000° F.) the complex silicides form a protective barrier between the metal manifold and the oxidizing environment of hot gases.

A prior-art slurry (formerly used to protect the surfaces of a metal manifold from 3000° F. gases) was comprised of three metal powders; sixty percent silicon, thirty percent hafnium, and ten percent chromium (the foregoing percentages are by weight, and with respect to the total weight of the three metal powders). In addition to the metal powders, the prior-art slurry was comprised of a nitrocellulose lacquer resin binder and an antisettling agent sold under the trademark MPA 60 by Rheox Inc., a subsidiary of NL Industries. The function of a binder is to cause the metallic powders to adhere to the surface being coated during the coating process. The function of an antisettling agent is to keep the metal powders uniformly suspended in the slurry both during storage and during the application process. Further details concerning the composition of the prior-art slurry are set forth in Naval Ordnance Command Weapon Specification 17302 (NAVORD WS 17302), entitled Material Specification, Slurry, Hafnium Silicide, which is incorporated herein by reference.

A problem with the coating formed from the above prior-art slurry was that when the manifold was in operation (i.e., conducting the 3000° F. gases) liquid silicides of Hf and Cr formed that sloughed off from the coating, and interfered with downstream moving parts. Another problem associated with the prior-art slurry was that the ingredient hafnium is an expensive and potentially hazardous material. An inconvenience in processing was that the MPA 60 antisettling agent (a waxy paste) was difficult to mix into the slurry.

Hence there is a need for a safer and less expensive high temperature protective slurry that would also minimize the risk of interfering with the operation of moving parts (in a hot gas distributing system downstream from the manifold) due to the sloughing away of coating constituents.

OBJECTS, FEATURES, AND ADVANTAGES

It is an object of the present invention to provide a coating material that will provide protection for the metal surfaces to which it is applied against the oxidizing environment of 3000° F. gases.

It is another object of the present invention to provide a coating material that during operation when subjected to 3000° F. gases will minimize the risk of contaminating downstream moving parts due to the sloughing away of constituents.

It is yet another object of the present invention to provide a coating material that does not contain hafnium.

It is a feature of the present invention that it is comprised of two metal powders, eighty percent silicon and twenty percent chromium (the foregoing percentages are by weight and with respect to the total weight of the two metal powders).

It is another feature of the present invention to use xylene as a constituent in the lacquer base.

It is an advantage of the present invention that during operation with 3000° F. gases the formation of liquid phases on the coating surface is nearly eliminated.

It is an advantage of the present invention that it does not contain ingredients tending to embrittle the ninety-percent-tantalum ten-percent-tungsten metal manifold under the conditions of coating fusion heat treatment.

It is an advantage of the present invention that, after the coating material is applied to the metal manifold substrate and before being fired, it dries to a tough adherent film that does not easily chip off.

It is an advantage of the present invention that evaporative losses are reduced (due to the presence of xylene in the lacquer base).

SUMMARY OF THE INVENTION

This invention is a protective coating material slurry that: (1) is suitable for being applied to metal surfaces as a slurry; then after drying (2) is suitable for being subjected to a fusion process in a vacuum oven thereby producing a ceramic coating; which then (3) is suitable for protecting the surfaces of a metal manifold from the oxidizing environment of 3000° F. products of combustion emanating from a solid-propellant-fueled hot gas generator.

The slurry is comprised of 52 percent metal powders, 45 percent lacquer base, and 3 percent antisettling agent. Both the formulation and the sequence and method of mixing the various constituents are of importance in order to produce the coating slurry of the present invention.

DESCRIPTION OF THE PREFERRED EMBODIMENT

Before proceeding with a detailed description of the manufacturing process for producing the slurry of the present invention, terminology and compositions of the important constituents will be provided. To avoid confusion, the terms percent and percentage shall always mean by weight, and (except when referring to the purity of a particular ingredient) are with respect to the sum of the weights of all the separate ingredients used to produce a batch of the slurry, unless it is specifically stated otherwise (e.g., where the percentages of the metals in a slurry are stated with respect to the total weight of all the metals). It is to be understood that the percentage values specified herein are approximate, and that minor variations may be made without departing from the scope of protection of the present patent and true spirit of the invention.

DEFINITIONS OF TERMS AND COMPOSITIONS OF CONSTITUENTS

Silicon Metal Powder: Per MIL-S-230 except (a) 98.0% pure (0.5% Al maximum, 0.8% Fe maximum), and (b) having a particle size of less than 45 microns (i.e., 325 mesh maximum).

Chromium Metal Powder: 98.5% pure (0.8% Fe, maximum), and having a particle size of less than 45 microns (i.e., 325 mesh maximum).

Metal powders: A mixture of the following two ingredients, by weight with respect to the total weight of the two ingredients: silicon metal powder 80%, chromium metal powder 20%. The preferred percentage of metal powders in the slurry is 52 percent.

Polymeric Binder: The polymer isobutyl methacrylate, having a maximum moisture content of 0.40% by weight. The preferred isobutyl methacrylate is sold under the trademark Elvacite 2045 by E. I. DuPont DeNemours & Co., purchased in the solid form as tiny white beads.

Toluene: The preferred grade is nitration grade per ASTM D841; the commercial grade is acceptable.

Xylene: The preferred grade is nitration grade per ASTM D843; the commercial grade is acceptable.

Lacquer Base: A mixture of the following three ingredients, by weight with respect to the total weight of the three ingredients: polymeric binder 15%, toluene 70%, and xylene 15%. The preferred percentage of lacquer base in the slurry is 45 percent.

Antisettling agent: Polyethylene wax 20%, toluene 80%. In liquid form, 200 to 800 CPS viscosity when measured with a Brookfield viscometer (RVT #2 spindle at 50 RPM). The preferred antisettling agent is sold under the trademark MPA 2000T by Rheox Inc., a subsidiary of NL Industries. The antisettling characteristics are activated during a ball milling operation by heat developed through shear. The preferred percentage of antisettling agent in the slurry is 3 percent.

Ball Mill: A suitable ball mill will have a stainless steel jar, fitted with three 0.5 inch diameter stainless steel lifter rods equally spaced around the inside diameter of the ball mill jar. The balls are also to be stainless steel, 0.5 inch diameter. The jar is to be approximately half-full of balls. The ball mill rotational speed is given by the equation $RPM = (181 - 0.66D)/D^{0.5}$, where D is the ball mill inside diameter in inches. For example, for a 10.62 inch inside diameter ball mill, the speed would be 53 RPM.

The size of available ball milling equipment will dictate the amount of slurry to be prepared in a batch. The volume of slurry chosen should be about twenty percent of the volume of the ball mill jar. For example, if a five liter ball mill jar were available, one liter of slurry (which would weigh approximately 1.6 kilograms) could be mixed. The preferred batch mixing process includes the following operative steps in the sequence listed.

Measuring out the appropriate amount of each of the ingredients (keeping the antisettling agent covered until it is to be used).

Combining the toluene and the xylene together in a suitable container and heating to between 100° and 120° F. (the use of a combination hot plate and magnetic stirrer is recommended; conduct this step under a ventilated hood).

Slowly adding the isobutyl methacrylate to the toluene and xylene ingredients while stirring and maintaining the temperature between 100° and 120° F., continuing stirring until the mixture is clear and free of solids.

Cooling the mixture to between 70° to 80° F.

Pouring approximately 170 ml (per liter of the batch of slurry being made) of the mixture into a beaker and setting it aside.

Adding the antisettling agent to the original cooled mixture while stirring continuously, then using the set-aside mixture to dissolve any remaining antisettling agent from within the container from which it was poured and adding this to the mixture.

Stirring the mixture for an additional four to six minutes.

Filling a suitable ball mill jar half full of balls and conditioning to between 65° and 80° F.

Pouring the mixed ingredients into the ball mill jar, then adding the metal powders and sealing the jar.

Mixing in the ball mill until the temperature of the slurry reaches 110° F., and then continuing mixing for an additional thirty to sixty minutes. The temperature rise must come from the milling action; the ball milling is to be done in a heat insulated enclosure, there is to be no external application of heat.

Cooling the slurry to below 80° F., then opening the jar.

After the above steps have been completed, the slurry should be removed from the jar (pour the slurry through a teflon or stainless steel strainer to separate the slurry from the balls). Inspect the ball mill jar for sludge deposits. If sludge has formed, pour the slurry back into the jar and stir the sludge into solution; then add the balls, seal the jar and mill for an additional fifteen to twenty minutes. Once again, cool the slurry to below 80° F. before opening the jar.

Adjusting the viscosity of the slurry to between 24 to 68 seconds Ford Cup viscosity by varying the toluene and xylene (i.e., solvent) content of the slurry; for example, by adding solvent to or evaporating solvent from the slurry. Added solvent should be a blend of 82% toluene and 18% xylene by weight.

Store finished slurry in sealed containers made of a material that will not react with the slurry. Steel paint can containers are recommended. Slurry should be stored indoors at between 55° and 95° F.

Although the above description contains many specificities these should not be construed as limiting the scope of the invention, but rather as an exemplification of one preferred embodiment thereof. Accordingly, the scope of the invention should be determined not by the particular embodiment presented, but by the appended claims and their legal equivalents.

That which is claimed is:

1. A coating slurry produced by a process comprising the steps of:
    (1) placing a quantity 31.5 percent by weight of toluene and a quantity 6.8 percent by weight of xylene in a suitable container and then stirring these ingredients together while heating to a temperature between 100° and 120° F.;
    (2) adding a quantity 6.8 percent by weight of a polymeric binder to the mixture of ingredients in the container while continuing stirring and maintaining the temperature between 100° and 120° F. until the mixture is clear and free of solids;
    (3) cooling the mixture to between 70° to 80° F.;
    (4) adding a quantity 3.0 percent by weight of an antisettling agent to the cooled mixture while stirring continuously;

(5) stirring the mixture for an additional four to six minutes after all the antisettling agent has been added;
(6) filling a suitable ball mill jar half full of balls and conditioning to a temperature of between 65° and 80° F.;
(7) pouring the mixed ingredients into the ball mill jar;
(8) pouring a quantity 41.6 percent by weight of silicon metal powder into the ball mill jar;
(9) pouring a quantity 10.4 percent by weight of chromium metal powder into the ball mill jar;
(10) sealing the ball mill jar;
(11) installing the ball mill jar on a suitable ball mill;
(12) mixing by ball milling until the temperature of the ingredients reaches 110° F. and then continuing the mixing by ball milling for an additional thirty to sixty minutes, whereby the mixed ingredients are converted to a slurry;
(13) cooling the slurry to below 80° F. and then opening the jar; and
(14) adjusting the viscosity of the slurry to between 24 to 68 seconds Ford Cup viscosity by suitably varying the toluene and xylene content of the slurry.

2. A coating slurry as recited in claim 1, wherein said polymeric binder added in step (2) is isobutyl methacrylate.

3. A coating slurry as recited in claim 1, wherein said antisettling agent added in step (4) is comprised 20 percent by weight of polyethylene wax and 80 percent by weight of toluene.

4. A coating slurry produced by a process comprising the steps of:
(1) placing a quantity 31.5 percent by weight of toluene and a quantity 6.8 percent by weight of xylene in a suitable container and then stirring these ingredients together while heating to a temperature between 100° and 120° F.;
(2) adding a quantity 6.8 percent by weight of a polymeric binder isobutyl methacrylate to the mixture of ingredients in the container while continuing stirring and maintaining the temperature between 100° and 120° F. until the mixture is clear and free of solids;
(3) cooling the mixture to between 70° to 80° F.;
(4) adding a quantity 3.0 percent by weight of an antisettling agent, said agent comprised 20 percent by weight of polyethylene wax and 80 percent by weight of toluene, to the cooled mixture while stirring continuously;
(5) stirring the mixture for an additional four to six minutes after all the antisettling agent has been added;
(6) filling a suitable ball mill jar half full of balls and conditioning to a temperature of between 65° and 80° F.;
(7) pouring the mixed ingredients into the ball mill jar;
(8) pouring a quantity 41.6 percent by weight of silicon metal powder into the ball mill jar;
(9) pouring a quantity 10.4 percent by weight of chromium metal powder into the ball mill jar;
(10) sealing the ball mill jar;
(11) installing the ball mill jar on a suitable ball mill;
(12) mixing by ball milling until the temperature of the ingredients reaches 110° F. and then continuing the mixing by ball milling for an additional thirty to sixty minutes, whereby the mixed ingredients are converted to a slurry;
(13) cooling the slurry to below 80° F. and then opening the jar; and
(14) adjusting the viscosity of the slurry to between 24 to 68 seconds Ford Cup viscosity by suitably varying the toluene and xylene content of the slurry.

5. A method for producing a slurry coating comprising the steps of:
(1) placing a quantity of toluene and a quantity of xylene in a suitable container and then stirring these ingredients together while heating to a temperature between 100° and 120° F.;
(2) adding a quantity of a polymeric binder to the mixture of ingredients in the container while continuing stirring and maintaining the temperature between 100° and 120° F. until the mixture is clear and free of solids;
(3) cooling the mixture to between 70° to 80° F.;
(4) adding a quantity of an antisettling agent to the cooled mixture while stirring continuously;
(5) stirring the mixture for an additional four to six minutes after all the antisettling agent has been added;
(6) filling a suitable ball mill jar half full of balls and conditioning to a temperature of between 65° and 80° F.;
(7) pouring the mixed ingredients into the ball mill jar;
(8) pouring a quantity of silicon metal powder into the ball mill jar;
(9) pouring a quantity of chromium metal powder into the ball mill jar;
(10) sealing the ball mill jar;
(11) installing the ball mill jar on a suitable ball mill;
(12) mixing by ball milling until the temperature of the ingredients reaches 110° F. and then continuing the mixing by ball milling for an additional thirty to sixty minutes, whereby the mixed ingredients are converted to a slurry;
(13) cooling the slurry to below 80° F. and then opening the jar; and
(14) adjusting the viscosity of the slurry by suitably varying the toluene and xylene content of the slurry.

* * * * *